Patented Mar. 20, 1945

2,372,084

UNITED STATES PATENT OFFICE 2,372,084

PROCESS OF DESULPHURIZING MOTOR FUELS AND IMPROVING OCTANE RATING

Minor C. K. Jones, Mountainside, N. J., assignor to Standard Oil Development Company, a corporation of Delaware No Drawing. Application October 24, 1942, Serial No. 463,220

5 Claims. (Cl. 196—28)

The present invention relates to improvements in the art of treating sour hydrocarbon oils and, more particularly, it relates to improvements in a catalytic process for converting sour hydrocarbon oil into a sweetened product.

Prior to my invention, numerous methods had been proposed for sweetening sour gasoline and other hydrocarbon oils. A commonly used method was the treatment of a sour hydrocarbon oil with the lead doctor solution which is a solution of sodium plumbite in water. This treatment with the sodium plumbite is normally followed with the addition of sulphur followed by settling to yield a product substantially free of the offensive odor of mercaptans and other foul smelling constituents of the sour oil. The theory of the lead solution treatment is that the mercaptans present in the sour oil are oxidized to the corresponding disulphides which latter components are substantially non-odoriferous, and although there is no net reduction in sulphur content of the treated oil, nevertheless the form in which the sulphur is present is substantially less offensive than the form in which it is present in the sour oil. There are also methods of sweetening sour hydrocarbon oils by treating the sour oil usually in the presence of cupric chloride supported on clay with oxygen or oxygen-containing gas. Here also the theory of the operation is that the cupric chloride oxidizes the foul smelling mercaptans to disulphides and is itself reduced to cuprous chloride. The thus reduced copper salt is oxidized from its cuprous form to the cupric form in situ for further use. Various other methods have been proposed for sweetening sour hydrocarbon oils.

My invention, on the other hand, involves a catalytic desulphurization where the total sulphur content of the sour oil is appreciably reduced and mercaptan sulphur is removed to yield a sweet product without additional treatment, the hydrogen sulphide which is the result of destruction of mercaptans being also removed at the same time.

In carrying my invention into practical effect, I charge the sour oil heated to a temperature within the range of about 900–950° F. over a pilled catalyst also maintained within this temperature range at a feed rate of 1 volume of oil per volume of catalyst per hour while maintaining a pressure of about atmospheric on the system. One catalyst which I employed had the following composition:

| | Percent by weight |
|---|---|
| Clay | 55 |
| Stoneware grog | 20 |
| Cuprous oxide | 20 |
| Chromium sesquioxide | 5 |

The proportion of each metallic oxide in the formula given may vary within plus or minus 1%.

A particularly active chromic oxide is prepared by roasting ammonium bichromate. While this is a preferred composition, vanadium pentoxide may be substituted for chromium oxide. The carrier may be varied to give greater heat resistance by using magnesite with the clay, as follows:

| | Percent |
|---|---|
| Clay | 37.5 |
| Magnesite | 37.5 |
| Cuprous oxide | 20.0 |
| Chromium sesquioxide | 5.0 |

Under the above conditions, I made two runs, one at 900° F. and the other at 950° F., and I have set forth these results in the following tabulation: I found that the total sulphur was reduced about 20%.

*Desulphurization of Venezuelan cracked naphtha containing 0.35% by weight sulphur with $Cu_2O$—$Cr_2O_3$ catalyst*

| | Feed stock | Run 1 | Run 2 |
|---|---|---|---|
| Operating conditions: | | | |
| Catalyst | | Pilled $Cu_2O$-$Cr_2O_3$ on clay | |
| Temperature °F | | 900 | 950 |
| Pressure #/sq. in | | Atmos. | Atmos. |
| Feed rate v./hr./v | | 1.0 | 1.0 |
| Reaction period hours | | 6 | 6 |
| Catalyst regenerations | | None | 1 |
| Corrected yields (100% wt.+100% C₄recycle: | | | |
| Dry gas weight per cent | | 0.72 | 1.13 |
| Gasoline volume per cent | 100 | 96.0 | 94.8 |
| Polymer do | | 3.0 | 3.9 |
| Coke weight per cent | | 0.27 | 0.26 |
| Actual gasoline inspections: | | | |
| Bromine number cg/g | 56.0 | 53.4 | 54.3 |
| Doctor test | DNP | Pass | Pass |
| Copper number | 3 | | |
| Sulphur weight per cent | 0.350 | 0.287 | 0.293 |
| Sulphur removal per cent | | 18 | 17 |

| | Feed stock | Run 1 | Run 2 |
|---|---|---|---|
| Octane number: | | | |
| ASTM—clear | 67.1 | 68.6 | 70.6 |
| +3.0 ml. TEL/gal | 76.1 | 77.5 | 78.9 |
| CFR-Res.—Clear | 73.0 | 75.2 | 75.9 |
| +3.0 ml. TEL/gal | 84.0 | 85.1 | 86.5 |
| Octane improvement: | | | |
| ASTM—Clear | | 1.5 | 3.5 |
| +3.0 ml. TEL/gal | | 1.4 | 2.8 |
| CFR-Res.—Clear | | 2.2 | 2.9 |
| +3.0 ml. TEL/gal | | 1.1 | 2.5 |
| Reid vapor pressure #/sq. in | 0.7 | 1.0 | 1.1 |
| Gravity °A.P.I. | 49.4 | 50.0 | 49.9 |
| Distillation: | | | |
| I.B.P °F | 213 | 213 | 202 |
| Per cent at— | | | |
| 212° F | | | 1.9 |
| 257° F | 28.5 | 28.5 | 29.5 |
| 302° F | 59.5 | 60.0 | 60.0 |
| 356° F | 85.0 | 89.0 | 83.5 |
| 392° F | 93.0 | 93.0 | |
| F.B.P °F | 405 | 394 | 391 |
| Recovery per cent | 93.5 | 93.5 | 93.5 |
| Loss do | 0.4 | 0.6 | 0.6 |
| Running gas analysis [1]: | | | |
| Specific gravity (air=1) | | 0.339 | 0.439 |
| Hydrogen volume per cent | | 72.9 | 57.7 |
| Methane do | | 12.7 | 18.8 |
| Ethane do | | 4.5 | 7.6 |
| Ethylene do | | 4.4 | 7.0 |
| Propane do | | 1.4 | 2.5 |
| Propylene do | | 2.5 | 3.9 |
| Butanes do | | 0.5 | 0.7 |
| Butylenes do | | 1.3 | 1.7 |
| Recoverable butane: | | | |
| Weight per cent | | 0.09 | 0.14 |
| Volume per cent | | 0.11 | 0.15 |

[1] Corrected to O₂, N₂ and CO free basis.

After the catalyst had been employed for 6 hours, it became necessary to regenerate the catalyst to remove sulphur compounds deposited therein by contact with the oil. This regeneration was accomplished by passing air at temperatures between 800° and 1100° F. through the catalyst whereupon the sulphur compounds were consumed by combustion. During this regeneration operation, it is advisable to maintain a back pressure of about 2 atmospheres on the catalyst undergoing regeneration, since this added pressure lowers the ignition temperature on the contaminants and the catalyst therefore may be safely regenerated rapidly. As usual, in a catalyst containing clay the same should not be heated above 1100° F. since heating above this temperature is apt to cause impairment of the catalyst by baking and fusion.

A very important advantage of the present invention over other catalytic processes is that hydrogen sulphide is removed simultaneously with mercaptans, and accordingly, in addition to obtaining a reduction of sulphur, a doctor sweet and hydrogen sulphide free product is obtained, requiring no subsequent treatment to pass doctor specification or for hydrogen sulphide removal.

An incidental feature of my invention is that the treatment results, in the case of naphtha or gasoline desulphurization, in a distinct octane number improvement. For example, in the second run which I made and which is set forth above, the treatment was carried out at a temperature of 950° F. and the improvement in octane number was about 3.

To recapitulate, my present invention relates to improvements in the catalytic desulphurization of sour hydrocarbon oils. I have found that a catalyst containing clay, cuprous oxide and an oxide of the VI group of the periodic system, such as chromium sesquioxide, when contacted with a sour hydrocarbon oil at high temperatures removes considerable sulphur from the said oil and thereby sweetens the same and, furthermore, that the treatment results in a distinct improvement in the octane number of the treated naphtha or gasoline.

What I claim is:

1. In a process for simultaneously desulphurizing a sour hydrocarbon oil and raising its octane rating, the improvement which comprises contacting the oil in vapor phase at elevated temperature with a catalyst which when placed in use contains a major proportion of cuprous oxide and a minor proportion of an oxide of a metal of the VI group of the periodic system, said oxides being supported on a carrier.

2. Method according to claim 1, in which a sour naphtha is the feed stock and it is contacted with the catalyst at a temperature within the range of about 900 to 950° F. and a pressure of about atmospheric for an extended period of time.

3. Method according to claim 1, in which the oxide of the VI group metal is chromium sesquioxide.

4. Method according to claim 1, in which the catalyst contains approximately 20% cuprous oxide, 5% chromium sesquioxide and 75% carrier.

5. Method according to claim 1, in which the catalyst contains approximately 37.5% clay, 37.5% magnesite, 20% cuprous oxide, and 5% chromium sesquioxide.

MINOR C. K. JONES.